UNITED STATES PATENT OFFICE.

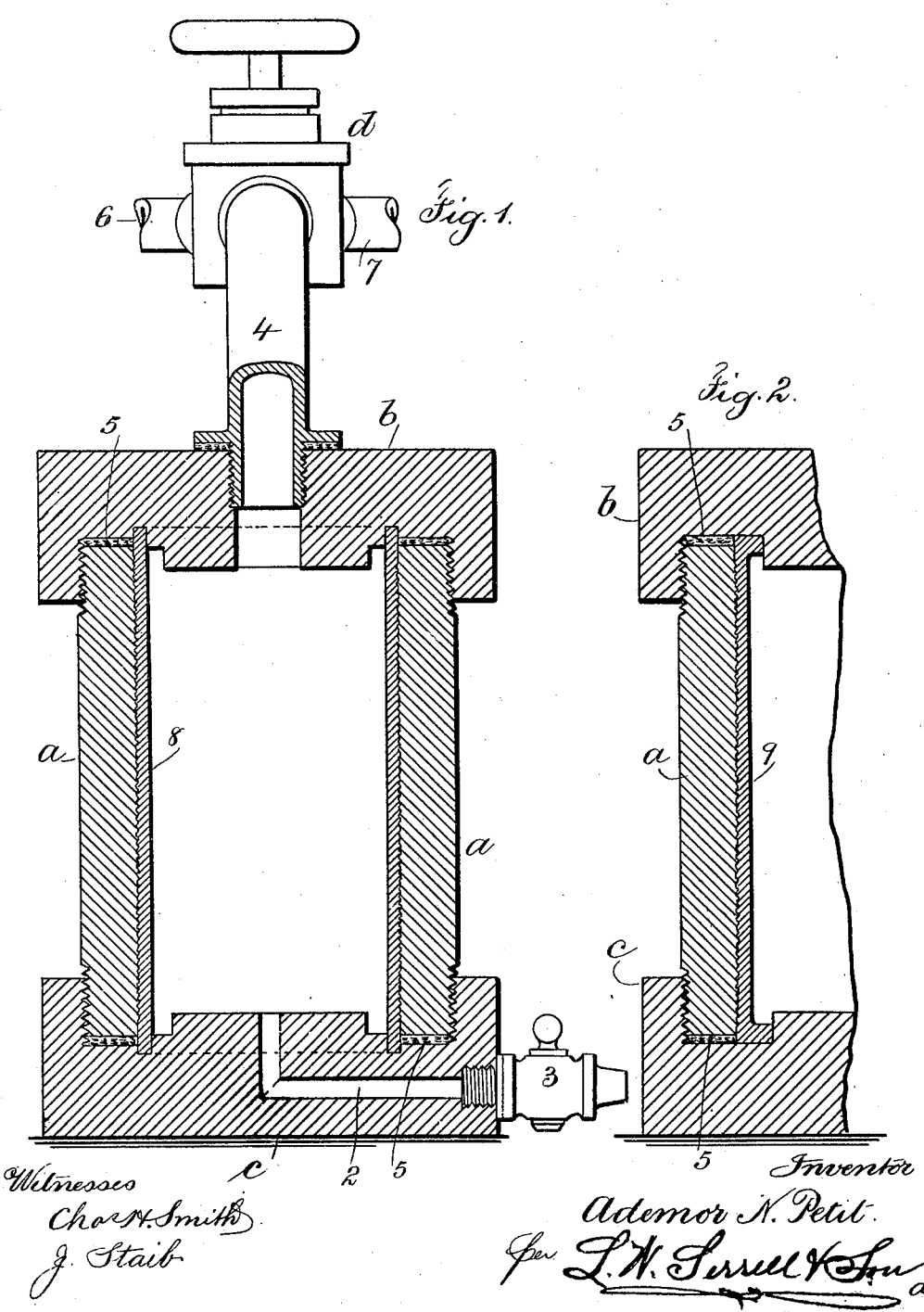

ADEMOR N. PETIT, OF NEWARK, NEW JERSEY, ASSIGNOR TO HIMSELF AND ALBERT O. PETIT, OF NEWARK, NEW JERSEY.

APPARATUS FOR MANUFACTURING DUPLICATE SOUND-RECORD CYLINDERS FOR PHONOGRAPHS.

SPECIFICATION forming part of Letters Patent No. 692,337, dated February 4, 1902.

Original application filed December 8, 1900, Serial No. 39,127. Divided and this application filed March 18, 1901. Serial No. 51,594. (No model.)

*To all whom it may concern:*

Be it known that I, ADEMOR N. PETIT, a citizen of the United States, residing at Newark, in the county of Essex and State of New Jersey, have invented an Improvement in Apparatus for Manufacturing Duplicate Sound-Record Cylinders for Phonographs and Similar Machines, of which the following is a specification.

Various devices and methods have heretofore been employed in the manufacture of duplicate sound-records for phonographs and similar machines; and the object of my present invention is to simplify the apparatus and at the same time to make use of an apparatus in which both heat and pressure may be made applicable.

In carrying out my invention I employ a cylindrical parallel-sided matrix, a head connected to the matrix at one end, and a base connected to the matrix at the other end, and I preferably place packings between the ends of the matrix and the surfaces of the head and base to form a steam and pressure tight joint. The base is provided with an exit-opening and an escape-cock, and the head is perforated and provided with a pipe and a three-way cock with pipes therefrom, one for steam and the other for compressed air.

In the drawings, Figure 1 is a vertical section representing my improved apparatus, Fig. 1 being shown of a structure adapted to one form of duplicate-record cylinder; and Fig. 2 is a partial vertical section representing a form of a construction of cylinder adapted to a form of duplicate sound-record cylinders where there are inturned ends or flanges.

My improved apparatus comprises a matrix *a*, a head *b*, connected by a threaded flange to one end of the said matrix, and a base *c*, connected also by a threaded flange to the other end of the said matrix in a similar manner, there being packings 5 preferably between the ends of the matrix and the head and base, so as to insure tight joints for both steam and air under pressure. The base *c* is provided with an exit-opening 2 and an escape-cock 3, and the head is centrally perforated and provided with a pipe 4. A three-way cock *d* is connected to the pipe 4, and pipes 6 and 7 extend in opposite directions from said three-way cock, the pipe 6 being for steam and the pipe 7 for compressed air. By these devices steam may be admitted through the pipe 4 to fill the space within the matrix and between the head and base or the steam may be allowed to escape by the cock 3 and compressed air admitted by the pipe 7 through the three-way cock and the pipe 4 to fill the space within the matrix.

In Fig. 1, 8 represents a duplicate sound-record cylinder within the matrix with its opposite ends held in annular grooves in the head and base, the said ends, with the said packings 5, confining both the steam and the compressed air in turn within the matrix and the said cylinder, so that the functions of the steam and the compressed air may be employed for the formation of the duplicate sound-record cylinder within the matrix pursuant to the method set forth in my application for Letters Patent filed December 8, 1900, Serial No. 39,127, and of which the present application is a division.

In Fig. 2 the duplicate sound-record cylinder 9 is shown with inturned ends or flanges, and the head *b* and base *c* are prepared with wider annular grooves for these parts, so that they fit within the grooves in the head and base and also form a substantially tight joint with the packings against the action of the steam or compressed air to prevent the escape of the same, and at the same time to prevent the said steam and compressed air from exercising their full functions upon the duplicate sound-record cylinders as provided in the aforesaid application.

My present application is in no sense related to the duplicate sound-record cylinder as an article or to the operation of the method employed in making the same or the materials of which said duplicate sound-record cylinders are composed. I do not herein limit myself to the manner of forming the matrix. This may be and preferably is made in any manner well known in the art—usually by an electrodeposit upon the surface of an original or master sound-record cylinder backed up with a substantial metal shell or cylinder from which the master-record is to be removed.

I claim as my invention—

1. An apparatus for the manufacture of duplicate sound-record cylinders for phonographs and similar machines, comprising a cylindrical matrix, a head connected thereto by a screw-thread at one end, a base connected thereto also by a screw-thread at the opposite end, the base being provided with an exit-opening and an escape-cock, a pipe connected to the head at an opening therein, a three-way cock connected to the pipe and pipes extending therefrom in opposite directions for steam and air, substantially as set forth.

2. An apparatus for the manufacture of duplicate sound-record cylinders for phonographs and similar machines, comprising a cylindrical matrix exteriorly threaded at the respective ends, a head having a threaded flange and connected to the matrix at one end, a base having a threaded flange and connected to the matrix at the opposite end, packings between the respective ends of the matrix and the inner faces of the head and base, the base being provided with an exit-opening and escape-cock, a pipe connected to the head at an opening therein, a three-way cock connected to said pipe and pipes extending therefrom in opposite directions for steam and compressed air, substantially as set forth.

3. An apparatus for the manufacture of duplicate sound-record cylinders for phonographs and similar machines, comprising a cylindrical matrix exteriorly threaded at the respective ends, a head having a threaded flange and connected to the matrix at one end, a base having a threaded flange and connected to the matrix at the opposite end, packings between the respective ends of the matrix and the inner faces of the head and base, the base being provided with an exit-opening and escape-cock, a pipe connected to the head at an opening therein, a three-way cock connected to said pipe, and pipes extending therefrom in opposite directions for steam and compressed air, the inner surfaces of the head and base being provided with annular recesses adjacent to the inner surface of the matrix to receive the respective ends of the duplicate sound-record cylinder, substantially as set forth.

Signed by me this 13th day of March, 1901.

ADEMOR N. PETIT.

Witnesses:
 GEO. T. PINCKNEY,
 S. T. HAVILAND.